UNITED STATES PATENT OFFICE.

WILLIAM N. BLAKEMAN, JR., OF NEW YORK, N. Y.

PIGMENT COMPOUND AND PROCESS OF MAKING THE SAME.

No. 883,516.  Specification of Letters Patent.  Patented March 31, 1908.

Application filed August 18, 1905. Serial No. 274,772.

*To all whom it may concern:*

Be it known that I, WILLIAM N. BLAKEMAN, Jr., a citizen of the United States, and resident of the borough of Manhattan, in the city, county, and State of New York, have invented a new and useful Pigment Compound and Process of Making the Same, which invention is fully set forth in the following specification.

The object of this invention is to produce, in paste form, a compound of a pigment which contains no hydroxyl and a liquid agent, which compound, or magma, when subsequently extended or attenuated in an oil, will form a paint that will spread in a smooth, uniform, homogeneous and elastic film, and dry rapidly.

Pigments which carry no water in combination and were formerly known as anhydrous, but which may be more accurately described as pigments free from hydroxyl, are deficient in spreading power, do not form satisfactory saponaceous compounds, and are slow in drying, when ground in the usual oil vehicle, and Dutch lead, in consequence of its quick formation of a saponaceous compound—due to the hydrated oxid of lead which it carries in combination—has, heretofore, been regarded as the only white pigment suitable for use as a sole basis for paint.

I have discovered that by first grinding, to a paste form, a pigment ordinarily deficient in spreading power and a hydrated liquid agent, a saponaceous compound will be quickly formed, and, when this compound, or magma, is extended or attenuated with commercial oil, as a vehicle, the paint so produced will spread in a smooth, uniform and elastic film and dry rapidly—in all respects equal, if not superior, to the combination of hydrated Dutch lead in linseed oil.

The hydrated liquid agent with which I grind the pigment, may be formed from an oil; a fat; a fatty derivative of an oil or fat; or equivalent substances which are insoluble in, or repellent to, water.

Selecting linseed oil, to illustrate my invention, I first hydrate it, which hydration may be effected by any suitable process. I prefer to place it in a vessel suitable for observation, with from 2 to 3 per cent. of distilled water distributed on the bottom, and then subject it to a moderate heat (140° to 160° Fahr.) The oil should be gently agitated at intervals until all the water has been absorbed and combined in the oil, which will require from 20 to 25 hours. The heat may be then raised to about 180 Fahr. for a short time, It is then ready to be combined with the pigment, and I take zinc oxid, for example, and grind it in 8 or 10 per cent. of this hydrated oil, thus forming a paste of about the same consistency as "white lead ground in oil" at present on the market. When desired for use as a paint, this compound, or magma, can be extended or attenuated with commercial linseed oil, in the usual manner, and, when so extended, the paint produced will be found satisfactory in all respects.

Instead of hydrating the oil by heating it in the presence of water as described, it may be hydrated by exposing it in shallow vessels, with broad surfaces, to the action of air and light; or by suspending the oil, in a suitable vessel, over a body of water, with a covering arranged to retain a vaporous atmosphere in contact with the oil; or by placing the oil in a vessel having about two or three per cent. of water distributed on its bottom and exposing this vessel to light and agitating the oil at intervals until the water has been absorbed and combined in the oil. These methods, however, will be found to be slower and less satisfactory than the method heretofore described, but I wish it to be understood that any suitable method of hydration may be employed in carrying out my invention.

Instead of using hydrated linseed oil as a liquid agent to combine with the pigment, other substances may be hydrated and so used, some of which are: other oils and fats, such as tung oil, or castor oil; a derivative of an oil or fat, such as oleic acid, olein, stearic acid, or stearin; or any other equivalent substance. Any of these substances may be hydrated by the method above described for linseed oil, or by any other suitable method of hydration, and then combined with a pigment to form a paste. Should any of the substances named be found to be too viscous to be easily manipulated, they may be first brought to the proper state of fluidity, by the use of any attenuant with which they are miscible or soluble and then be hydrated. In hydrating a viscous liquid such as castor oil, or tung oil, it will be found necessary to give a longer exposure to heat than for a less viscous liquid.

The oil or other liquid agent selected for use may, in addition to being hydrated be also oxidized, either before or after hydration, by any suitable method of oxidation, such as by heating the oil on oxidizers, by submitting it to the action of oxygen, or by incorporating oxidizers therewith.

The pigments which are rendered available for use by my invention, either singly or combined, include zinc oxid, zinc sulfid, lead sulfate, lead sulfite, lead carbonate, barium sulfate, barium carbonate, strontium sulfate, strontium carbonate, and the various combinations of zinc and lead resulting from furnace sublimation and known commercially as sublimed lead, oxysulfate of lead, zinc-lead, and other trade designations. These pigments, being of various composition, will require different degrees of hydration in the hydrated liquid agent with which they are combined in order that the best results may be produced, but the degree of hydration and the percentage of hydrated liquid agent to be used can be easily regulated in practice. A heavy pigment, like lead carbonate, will require only about 1/20 of one per cent. hydration in the liquid and from 5 to 7 per cent. of the hydrated liquid to form the magma; while zinc oxid or combinations of pigments, may require 2 per cent. or more of hydration in the liquid and from 8 to 10 per cent. of the hydrated liquid to form the magma. As, however, the hydrated liquid is miscible in all proportions with linseed oil, it will be seen that by adopting a uniform standard of hydration—say from two to three per cent.—for the liquid agent, such liquid-agent can be subsequently attenuated in linseed oil until the proper degree of hydration is obtained necessary for the pigment with which it is to be combined, and then the pigment be ground into a paste with such attenuated hydrated liquid agent.

In order to ascertain the degree of hydration necessary for a particular pigment, the film test may be employed. For example: When 8 to 10 per cent. of hydrated linseed oil is ground into paste form with zinc oxid, and this magma then extended with the requisite quantity of commercial linseed oil to form a paint, and the usual quantity of liquid drier added, if the paint so produced follows the brush in a smooth, homogeneous and uniform film, does not run, crack, or craze, and dries in from 3 to 5 hours according to climatic conditions, the degree of hydration in the liquid may be regarded as satisfactory.

Increased spreading power will be produced in the magma, if the pigment itself be treated by combining therewith a hydrated metallic or earthy oxid, such as hydroxid of zinc, or other hydroxid. From 1 to 5 per cent. of hydroxid may be used, depending upon the pigment treated. The hydroxid may be attenuated in water, then incorporated with the pigment, and the water afterwards evaporated.

Two or more substances of the character described may be hydrated and combined to form the liquid agent; and two or more oils, drying or non-drying, may be combined to form the paint-vehicle.

Heat, pressure and agitation may be employed, at any stage of the process, if deemed advisable.

From the above description, it will be seen that as a result of my invention, all those pigments which by reason of a deficiency in spreading power have heretofore been regarded as unavailable for use except when used with Dutch lead, can be placed upon the market in paste form ready to be extended or attenuated with linseed oil by the painter, exactly as white lead is sold and manipulated at the present day; and, as I believe myself to be the first person to accomplish this result, I wish it to be understood that the degree of hydration, the proportion of substances, the number and character of ingredients, and the steps of the process, may be varied as practice shall dictate without departing from the essence of my invention.

Having thus fully described my invention, I claim:

1. A compound or mixture, in paste form, of a pigment deficient in spreading power, and a hydrated fatty liquid.

2. A compound or mixture, in paste form, of a pigment deficient in spreading power, and a hydrated oil.

3. A compound or mixture, in paste form, of a pigment deficient in spreading power, a hydrated fatty liquid, and an attenuating oil.

4. The process herein described which consists in first hydrating a fatty liquid and then grinding therein, to form a paste, a pigment deficient in spreading power.

WM. N. BLAKEMAN, JR.

Witnesses:
FRANCIS P. REILLY,
FRED W. ABELL.